(12) United States Patent
Dickey

(10) Patent No.: US 6,959,352 B1
(45) Date of Patent: Oct. 25, 2005

(54) SYSTEM AND METHOD FOR ALLOWING NON-TRUSTED PROCESSORS TO INTERRUPT A PROCESSOR SAFELY

(75) Inventor: Kent A. Dickey, Westford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/561,815

(22) Filed: Apr. 29, 2000

(51) Int. Cl.[7] ............................................. G06F 13/24
(52) U.S. Cl. ..................................... 710/262; 713/201
(58) Field of Search ........................ 710/260, 261–263, 710/266–267, 200; 713/200–202, 189, 192, 713/193, 194; 326/8

(56) References Cited

U.S. PATENT DOCUMENTS 5,684,948 A * 11/1997 Johnson et al. ............. 713/200
5,687,379 A * 11/1997 Smith et al. ................ 710/200
6,199,181 B1 * 3/2001 Rechef et al. ................ 714/38

* cited by examiner

Primary Examiner—Glenn A. Auve
Assistant Examiner—Clifford Knoll

(57) ABSTRACT

The present invention provides for a method and system for allowing non-trusted partitions in large scale computer system to safely interrupt a processor without the risk of corruption or loss of interconnect bandwidth, and without the need for inefficient hardwiring. In operation code preferably located outside of the central processor, interrupts coming from outside the partition into specific addresses for determination of allowability into the partition.

14 Claims, 3 Drawing Sheets

SYSTEM AND METHOD FOR ALLOWING NON-TRUSTED PROCESSORS TO INTERRUPT A PROCESSOR SAFELY

TECHNICAL FIELD

The invention relates in general to computer systems and in particular to exception conditions between processing areas.

BACKGROUND

Computer systems have been designed to be divided up into partitions. A partition is a complete computer system running an Operating System "OS" image, user applications, etc. separately from other partitions, wherein hardware provides "firewalls" between the partitions. This is generally done to prevent a failure in one partition from propagating a failure in another partition as a result of various forms of corruption stemming from software faults, and/or hardware faults, whether malicious or otherwise. Accordingly, firewalls generally function as barriers, which ignore all communication from a partition which a given partition does not trust, such that any traffic which arrives from an untrusted partition will be discarded.

In implementing these firewalls, many known systems do not allow communication such as interrupts across a partition boundary, because of the potential for corruption. Conversely, however, some problems are created if a system does not allow any communication. Not the least of these problems is that one loses the benefit of the high bandwidth interconnect of a system, given that the interconnect will be essentially shared between the partitions. Also, many previous systems do not allow any interrupts across a partition boundary. This generally limits the functionality of the system because there are many cases where interrupts are truly useful, such as for cases involving communication of indicators representing a situation involving a processor seeking to join a subject partition, or indicators of some other special event. Without interrupts between partitions, software is generally needed to poll for these events. This type of software based approach is much less efficient because, while one might achieve high availability, the system loses most of the benefits of the built in hardware. Accordingly, many systems utilize a scheme which permits some interrupts to pass. Systems which do allow interrupts across a partition boundary might only allow for a special, single, hard wired interrupt. Hard wired approaches are limited in that they do not have the ability to handle interrupt flexibility that systems need for optional performance. A hard wired interrupt can cause problems where an OS needs a particular interrupt number for other purposes. Thus, a single interrupt has the drawback that an infrequent, but expensive-to-handle event, such as having an external processor join a subject partition, would share the same interrupt line as a frequent but less-expensive event, (e.g., such as that used for communicating that a database update is complete), thus incurring the need for yet further software to poll all possible sources to determine which event was indicated. Moreover, once such a system lets some traffic through, the system becomes vulnerable to corruption from other partitions. Hence, if a partition lets some traffic through, the subject partition must necessarily have to trust the other partition at least to some degree in order to provide well-formed transactions which follow the subject rules. Of course, this arrangement and others would allow another partition to propagate a failure of the subject partition, particularly if there is purposely corrupted data present.

It will be seen that the prior art approach to solving the problems relating to communication between partitions is rife with shortcomings. For example, if an absolute communication firewall is established between partitions, one loses the benefit of high bandwidth of the system. Further, if a system partition permits an interrupt to go through, there will be an attendant danger of error propagation between partitions. Thus, there is need for a way to let some types of traffic through in a way that minimizes corruption of a subject partition, even if the other partition contains purposely corrupted data and generates corrupting traffic.

Hence, it is one of the objects of the present invention is to permit a non-trusted processor to interrupt a processor safely.

SUMMARY OF THE INVENTION

These and other objects, features and technical advantages are achieved by a system and method which permits communication between partitions and allows for efficient bandwidth usage therebetween, yet avoids unnecessary exposure to corruption from error propagation and/or intentionally corrupting manipulation from other partitions. In doing so, this invention provides a light-weight, easy-to-implement design which allows interrupts from non-trusted sources to come from outside a partition.

More specifically, the invention allows only a certain number of untrusted interrupt transactions through a firewall to a subject processor within a given partition by manipulation of the interrupt number. This manipulation is accomplished by forcing the untrusted interrupt number into a software-defined range, which means that even an intentionally corrupt partition cannot send the subject partition interrupts that masquerade, for example, as a SCSI card or anything that would cause an OS to operate abnormally. The invention preferably provides for flexibility in usage in that the software defined range can be as small as one interrupt, or as many as 32 interrupts.

In order to accomplish the above, the present invention is generally directed to the use of a software based filtering solution, an instantiation of which resides as chipset logic outside the core processor logic so as to filter interrupt requests externally. Given that the present invention applies to systems where the interrupt transaction itself can be detected from other transactions through known means, the inventive system can accomplish the filtering according to the transaction type and the address. In the contemplated scheme, a given interrupt number is an encoded number, and the invention provides, for example, for a "5" to be represented as "interrupt 5". Operation in this manner will not cause the interrupt to be expanded bit wise because the allowable interrupt numbers are expanded by a masking module which changes the vector or position of the interrupt.

Thus, the invention preferably provides for the designation of any source partition as a coded register which would let the subject partition black out some partition sources, particularly in cases where there is a continually, intentionally corrupt partition that needs to be ignored. The invention further provides that, even for a set of untrusted sources, the system generally permits interrupts to come in by adjusting the interrupt number to be in a defined region in order that the untrusted interrupt stays out of the way of e.g., OS interrupts that the subject partition might be using for communication regarding important modules such as SCSI devices, etc., yet still be able to see that an external agent left an interrupt for the subject partition. The present invention provides for communication to occur between partitions at a relatively high speed, and allows for situations where another partition wishes to tell a subject partition something, and for the other partition to send an interrupt which the subject partition can review (after receiving the interrupt), to see what specific action was requested.

In this manner, the preferred embodiment of the inventive system lets a given partition have a strong firewall constantly, yet allows these interrupts to cross in from untrusted sources without any chance of corruption of the subject partition. Moreover, provision of additional, allowable interrupt numbers significantly reduces the polling overhead common to other software solutions. Another advantage is the extra check for the source of the interrupt. If it is decided that the source of the interrupt cannot be completely trusted, then a source (or group of sources) can be completely excluded from sending interrupts.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

FIG, 4 depicts a preferred format for an inventive interrupt packet; and

Figure 5:
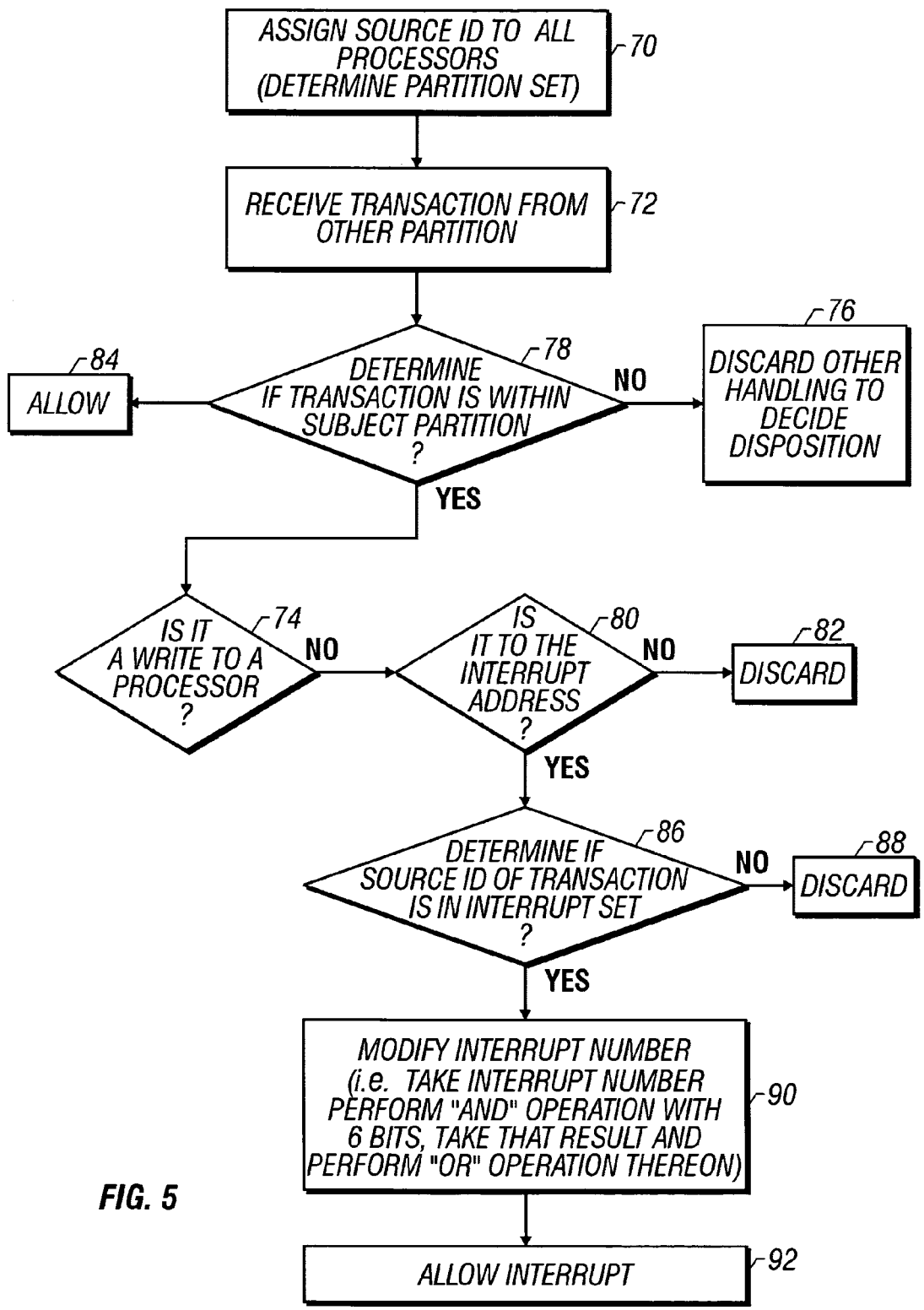

FIG. 5 depicts a flow diagram representing the preferred order of decisions and information assignment for the inventive filtering process of underlying the software based logic.

DETAILED DESCRIPTION

Figure 1:
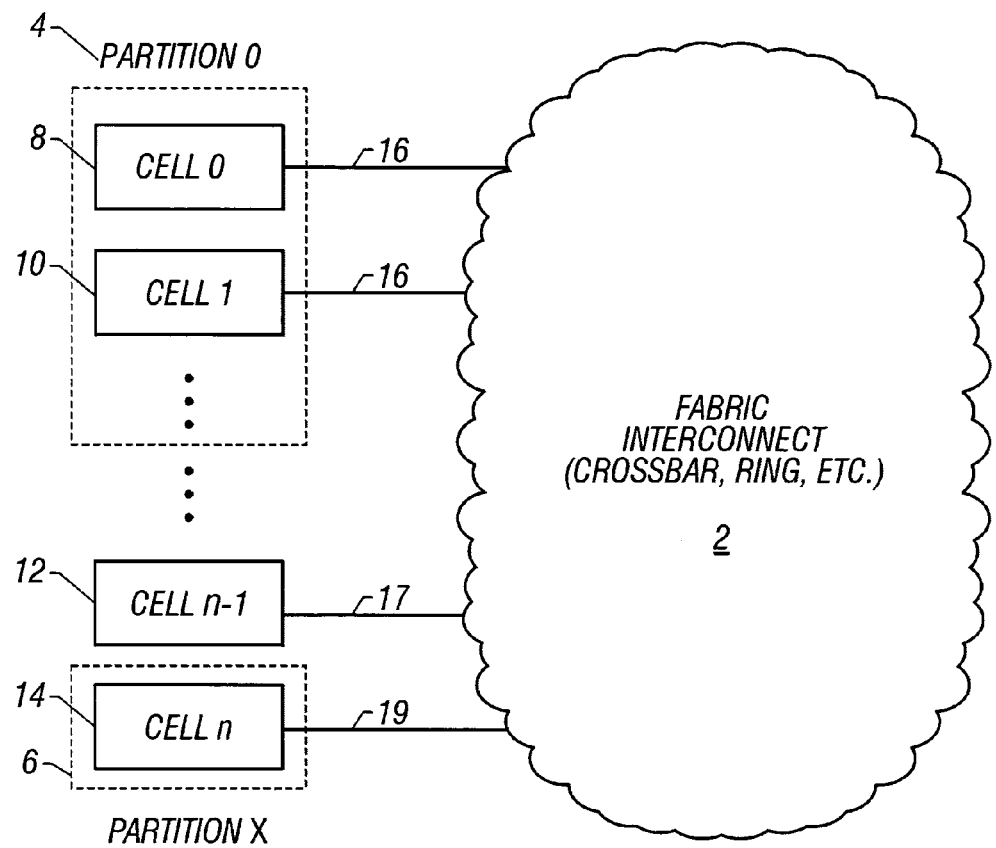
FIG. 1 depicts a high level exemplary block diagram of the inventive cell topology, in connection with a fabric interconnect.

The inventive system and method is best adapted for use on an inventive cell topology in connection with a fabric interconnect such as that shown in FIG. 1, which depicts a high level exemption block diagram which forms a preferred environment in which the inventive system and method is situated. By way of overview, a large computer system is divided into partitions 0–x (represented at 4), which are connected via a fabric interconnect 2, which may be either a ring topology base, a crossbar base, or other networking mechanism, as known in the art. With continuing cross reference to FIG. 2, each partition 4, 6, will be made up of at least one cell 20 so that there will be a plurality of cells, numbered 0 through n. Although the variations in specific architecture are virtually unlimited, and are generally tailored to specific needs, by way of simple illustrative example, one might have a system such as that depicted in FIG. 1, having a plurality of partitions such that partition 0, located at 4, is connected to partition x, located at 6, via connection 16 to fabric 2 through connection 19. In this particular partition 0 has two cells, cell number 0 located at 8, and cell number 1 located at 10. Independent of either of these partitions is cell number n−1, located at 12, which is connected to partition 0 through connection 17 via fabric 2 to connection 16. Similarly, cell number n−1, located at 12, is connected to partition x, located at 6, through connection 17 via fabric 2 through connection 19. Ultimately, any given cell 20 may try to communicate with any other cell 20, whether within a common partition, or without via filter module 21, FIG. 2.

Figure 3:
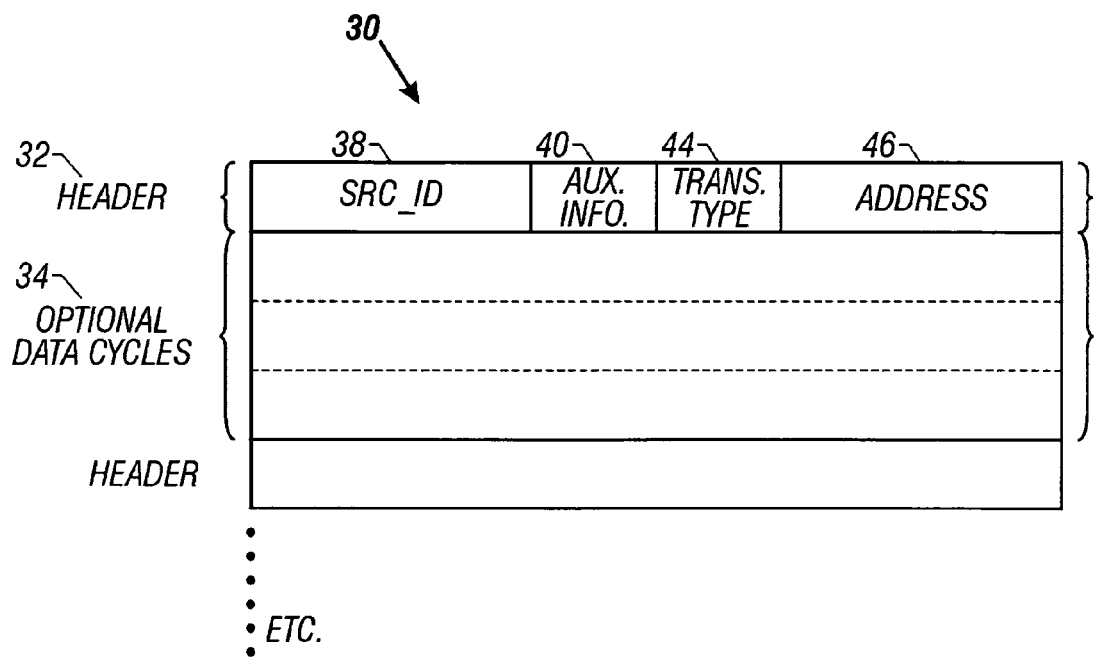
FIG. 3 depicts a preferred format for an inventive fabric packet.

When communicating via fabric 2, the preferred embodiment will utilize a fabric packet 30 in the format depicted in FIG. 3, which will most preferably be bifurcated into a header 32 and (optional) data cycles 34. Within header 32, the preferred information will comprise source ID 38 for identifying the processor ID number; auxiliary information 40; transaction type 44, which will detail information relating to whether there is a read, write, etc.; and address 46, which will detail information relating to where the packet is going.

Figure 4:
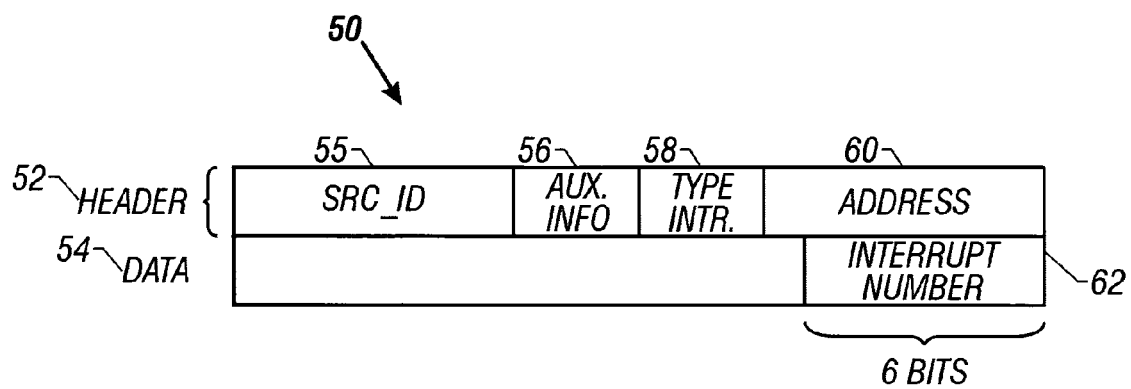

Turning to FIG. 4, instead of using fabric packet 30, a most preferred embodiment will generally provide for interrupt packet 50. This format is typically used between cells 20 within a given partition, or between cells from different partitions. The format of interrupt packet 50 is preferably divided into a header 52 and data 54. Header 52 will typically contain source ID number (SRC_ID) 55; auxiliary info 56 (which contains routing information or other pocket information); transaction type 58; and address 60, which is used for conveying where the packet originated, is headed (i.e., whether it is allowed, discarded, etc.). Within data cycle 54 is a 6 bit interrupt number 62.

Figure 2:
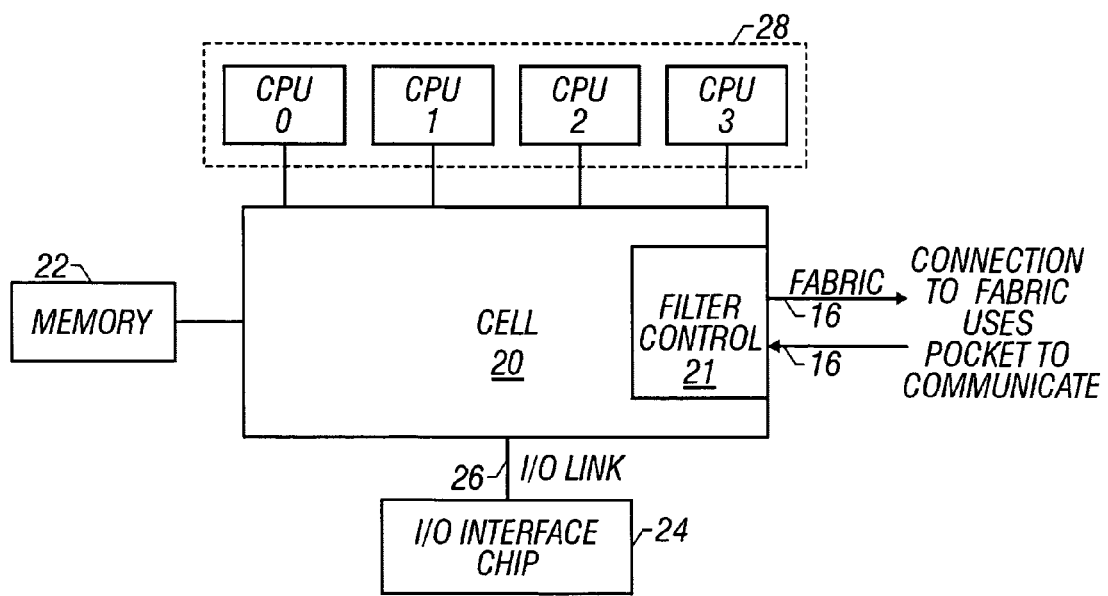
FIG. 2 depicts an exemplary block diagram of the inventive cell module forming a subject partition.

Typically, both fabric packet 30 and interrupt packet 50 must pass through some level of firewall when passing from an outside partition or cell. Nevertheless, the inventive methodology and apparatus is most preferably situated at the individual cell level, as depicted in FIG. 2. Specifically, cell 20 is connected to fabric 2 via connections 16 which receive and send fabric packets 30 and interrupt packet 50. Cell 20 also has an I/O link 26, which is for connection to an I/O interface chip 24. Also provided with cell 20 is memory 22. As mentioned, cell 20 may be a subunit of a given partition, but an individual cell 20 may be further divided into a processor grouping 28 which has any number of CPUs as need according to individual specifications known in the art. The inventive process is preferably situated in a filtering module 21, which is most preferably located on cell 20 as a unified filtering device which implements the inventive logic to process incoming traffic from fabric 2 via connective 16. Although alternative embodiments provide for the filtering module to be distributed across the cell, and to be assigned geographically according to the particular task specific filtering (i.e., a filtering module just for memory 22, one for each CPU within CPU group 28, one for ID link 26, interface 24, etc., whereby each will respond to unit specific traffic only).

Accordingly, the inventive system uses software, preferably situated within a single, unified hardware module, which is based most preferably in the chipset, so that it is located substantially outside the core processor logic in order to be able to filter interrupts from untrusted sources externally. Procedurally, the inventive system is able to provide the described advantages by handling interrupts in the system as writes to special addresses, where each processor in the system has a unique address assigned to its interrupt register such that writing a number to that register causes the subject processor to see that interrupt number. For example, writing a 5 and then a 10 to the interrupt register causes the processor to think both interrupts 5 and 10 are now pending. In order to provide expanded information regarding interrupt requests, the inventive system provides that all processor agents are to be given an identifying number. Under this scheme, several CPUs might share the same identifying ("ID") number, but only if they are in the same partition. In a preferred embodiment, the range of ID numbers will be relatively small, say 64 or so, providing for a numerical range of 0–63. Similarly, consideration or convenience dictate that a preferred embodiment of the range of processor interrupts will also be 64 (i.e., range of 0 to 63), each of which will be assigned by the OS as known in the art. As such, the preferred embodiment of the present invention requires a 64-bit Interrupt_Set register, a 64-bit Partition_Set register, a 6-bit Interrupt_AND_Mask and a 6-bit Interrupt_OR_Mask, which essentially entails, as seen in FIG. 5, taking a 6 bit interrupt number at 62 and performing an AND operation on it, and then an OR operation thereon, at step 90. Thus, FIG. 5 is for an illustration of the preferred inventive steps involved in the aforementioned filtering, the invention first assigns a source ID (SRC_ID) 55 at 70 to all processors for later use in determining the partition set. Upon receiving a transaction from another partition at 72, the transaction is examined at 74 to see if it is a write to a processor. If source ID number (SRC_ID) 55 on the transaction is within the Partition_Set (that is, Partition_Set [ID_number] is set), the transaction is noted as being from within the subject partition, and accordingly, is allowed to progress to decision block 78 (at 84 to the subject processor). If the transaction is deemed not to be within the subject partition, the system checks to see if the transaction is directed to the interrupt address at 80. If the transaction is not directed to the interrupt address, then the logic will discard the transaction at 82.

If there is a write to the interrupt address of subject processor (which might be located in block 28 of an exemplary cell 20 within a given partition, depicted in FIG. 2) from outside the partition, the system will check at 86 to see if the source ID number (SRC_ID) 55 is in the Interrupt_Set (i.e., asks the question: "is Interrupt_Set [ID_number] set"?). If the ID number is not set, then the system drops it at 88. However, if the ID number is set in the Interrupt_Set, then the system allows the interrupt to progress to the next step, at 90. Nevertheless, in allowing the interrupt, the system will modify the interrupt number at 90 by use of a logic array which takes the interrupt number of the transaction and perform a bitwise AND operation via the Interrupt_AND_Mask, and then perform a bitwise OR operation via the Interrupt_OR_Mask. The logic array, although not depicted specifically may be structured according to the implementation of standard AND and OR operation mask structures as known in the art, but used for interrupt numbers in the progression described above. Once these operations are performed, the system will permit, at 92, the resulting interrupt to be driven to the processor. By way of example of an operation involving the inventive modified module, if one were to assume that, say, Interrupt_AND_Mask has been assigned as 0x03, and that Interrupt_OR_Mask has been assigned as 0x18, an exemplary interrupt at 0x21 would be reformulated as a resulting interrupt 0x19. By way of an illustrative binary examples within OR_mask set to=001010, and an AND_mask set to= 000001. Then Interrupt 000101 gets converted to 001011; Interrupt 101000 gets converted to 001010; Interrupt 111000 gets converted to 001010; Interrupt 000000 gets converted to 001010; Interrupt 000111 gets converted to 001011; and Interrupt 010011 gets converted to 001011.

Thus, the inventive masking operation of the modification module forces the interrupt number into a power-of-2 size range (i.e., 2, 4, 8, 16, 32, 64). This provides for an inventive software based solution within an inventive hardware module, which forces all inter-partition interrupts to go to several interrupt vectors, or even to one vector, at many different interrupt positions. This flexibility is important since many interrupt numbers are reserved already by the OS. Allowing more than one vector or position is beneficial for performance purposes in order that a single interrupt line does not get overused. Essentially, the system contains the interrupts to the power of 2 size mentioned above, and performs the processing of the AND operation and the OR operation mentioned above through standard AND and OR masks as known in the art. Moreover, the design also allows, through the Interrupt_Set register (which is a set of allowable interrupt sources) for only a subset of possible external agents to interrupt, which will ideally range about 64 in number (i.e., 0–63). Hence, if a particular interrupting agent is found to be defective and creating unnecessary "noise" traffic, it can be completely excluded through the Interrupt_Set register (i.e., the system checks to see if the source ID number 55 (SRC_ID) is allowable, or if it needs to be turned away).

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for allowing a processor located outside a partition to safely interrupt a processor located within a partition comprising the steps of:

receiving a transaction, directed to a target processor within said partition, with chipset logic that is separate from said target processor;

determining if said transaction is from another processor within said partition or from said processor located outside said partition;

allowing a transaction to proceed to said target processor if said transaction is determined to be from said other in-partition processor;

if said transaction is determined to be from said out-of-partition processor, evaluating said transaction to determine whether said transaction is of a particular type;

if said transaction has been determined to be of said particular type, substantively altering said out-of-partition transaction; and allowing said altered transaction to proceed to the processor.

2. The method of claim 1 further comprising the step of:

discarding those transactions which are not from within the partition and which are determined not to be of said particular type.

3. The method of claim 1 wherein said particular type is an interrupt.

4. The method of claim 3 wherein said altering step further comprises the steps of:

changing an interrupt number of the interrupt determined not to be from said partition into a power of 2.

5. The method of claim 4 wherein said changing step further comprises the steps of:

taking a number representing the interrupt and performing a bitwise AND operation thereon with an AND mask; and further performing a bitwise OR operation thereon with an OR mask.

6. A module for allowing a processor located outside a partition to safely communicate interrupts to a target processor located within said partition, said module comprising:

a chipset that receives for receiving a transaction directed to said in-partition processor, and that is physically separate from said target processor;

a determination module that determines a location of said source processor;

a transaction module that drives a transaction from a source processor determined to be within said partition to said target processor;

an evaluation module that evaluates a transaction from a source processor determined to be outside said partition, and determines if said out-of-partition transaction is an interrupt;

a modification module that structurally alters out-of-partition interrupts; and an allowance module that drives altered out-of partition interrupts to said target processor.

7. The module of claim 6 which further includes:

a disposal module that discards out-of-partition transactions determined not to be interrupts.

8. The module of claim 7 wherein said modification module further includes a logic array that changes an interrupt number of said out-of-partition interrupts to a power of 2.

9. The module of claim 8 wherein said logic array is programmed to take said interrupt number and perform a bitwise AND operation thereon with an AND mask and perform a bitwise OR operation thereon with an OR mask.

10. Computer readable code, stored on a computer readable medium, said code comprising:

code for determining a source of a transaction directed to a target processor, wherein said target processor is located within a computer system partition, and wherein said source determining code determines if said source is located inside or outside said partition;

code for determining a nature of a transaction determined to have an out-of-partition source, wherein said nature determining code determines if said out-of-partition transaction is an interrupt;

code for performing at least one bitwise operation on said out-of-partition interrupt that structurally alters said out-of-partition interrupt; and code for driving said alleged out-of-partition interrupt to said target processor.

11. The code of claim 10, wherein said code for altering further comprises:

code for performing a bitwise AND operation on said out-of-partition interrupt; and code for performing a bitwise OR operation on said out-of-partition interrupt.

12. The code of claim 11 wherein said bitwise AND operation and said bitwise OR operation together alter an interrupt number of said out-of-partition interrupt into a power of 2.

13. The code of claim 10 further comprising:

code for driving to said target processor, transactions from sources determined to be located within said partition.

14. The code of claim 10 further comprising:

code for discarding an out-of-partition transaction determined not to be an interrupt.

* * * * *